US009582285B2

(12) United States Patent
Al Sheikh et al.

(10) Patent No.: US 9,582,285 B2
(45) Date of Patent: Feb. 28, 2017

(54) SPECULATIVE HISTORY FORWARDING IN OVERRIDING BRANCH PREDICTORS, AND RELATED CIRCUITS, METHODS, AND COMPUTER-READABLE MEDIA

(71) Applicant: QUALCOMM Incorporated, San Diego, CA (US)

(72) Inventors: Rami Mohammad Al Sheikh, Raleigh, NC (US); Raguram Damodaran, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 578 days.

(21) Appl. No.: 14/223,091

(22) Filed: Mar. 24, 2014

(65) Prior Publication Data

US 2015/0268958 A1    Sep. 24, 2015

(51) Int. Cl.
*G06F 9/30* (2006.01)
*G06F 9/38* (2006.01)

(52) U.S. Cl.
CPC ........... *G06F 9/3848* (2013.01); *G06F 9/3844* (2013.01)

(58) Field of Classification Search
CPC .............................. G06F 9/3844; G06F 9/3848
See application file for complete search history.

(56) References Cited

U.S. PATENT DOCUMENTS

| 6,134,654 | A | 10/2000 | Patel et al. |
|---|---|---|---|
| 7,673,122 | B1 | 3/2010 | Song et al. |
| 7,707,398 | B2 | 4/2010 | Olson et al. |
| 7,836,288 | B2 | 11/2010 | Nancekievill |
| 2001/0056531 | A1 | 12/2001 | McFarling |
| 2002/0188834 | A1* | 12/2002 | McDonald ............ G06F 9/3844 712/238 |

(Continued)

FOREIGN PATENT DOCUMENTS

WO    2013085599 A1    6/2013

OTHER PUBLICATIONS

Second Written Opinion for PCT/US2015/021997, mailed Feb. 25, 2016, 6 pages.

(Continued)

*Primary Examiner* — Corey S Faherty
(74) *Attorney, Agent, or Firm* — Withrow & Terranova, PLLC

(57) ABSTRACT

Speculative history forwarding in overriding branch predictors, and related circuits, methods, and computer-readable media are disclosed. In one embodiment, a branch prediction circuit including a first branch predictor and a second branch predictor is provided. The first branch predictor generates a first branch prediction for a conditional branch instruction, and the first branch prediction is stored in a first branch prediction history. The first branch prediction is also speculatively forwarded to a second branch prediction history. The second branch predictor subsequently generates a second branch prediction based on the second branch prediction history, including the speculatively forwarded first branch prediction. By enabling the second branch predictor to base its branch prediction on the speculatively forwarded first branch prediction, an accuracy of the second branch predictor may be improved.

20 Claims, 6 Drawing Sheets

(56) References Cited

U.S. PATENT DOCUMENTS

| | | | |
|---|---|---|---|
| 2005/0132175 A1* | 6/2005 | Henry | G06F 9/30149 712/239 |
| 2006/0036837 A1* | 2/2006 | Stark | G06F 9/3848 712/239 |
| 2007/0050776 A1* | 3/2007 | Ferren | G06F 9/3844 718/104 |
| 2012/0166775 A1 | 6/2012 | Krishnamurthy et al. | |
| 2013/0007425 A1 | 1/2013 | Cantin et al. | |

OTHER PUBLICATIONS

First Examination Report for Bangladesh Patent Application No. BD/P/2015/000065, mailed Mar. 7, 2016, 2 pages.
International Preliminary Report on Patentability for PCT/US2015/021997, mailed Jun. 14, 2016, 29 pages.
International Search Report and Written Opinion for PCT/US2015/021997, mailed Jun. 25, 2015, 11 pages.

* cited by examiner ns are re-fetched based on the second branch prediction. Even though the re-fetching of instructions may incur a performance penalty, the processor still achieves a net performance improvement compared to the penalty incurred by waiting until the instructions reach the execution stage before re-fetching. This is particularly the case with processors having a large number of pipeline stages between instruction fetching and instruction execution.

However, because of the multi-cycle latency of the second branch predictor of the overriding branch predictor, the second branch predictor must base its branch predictions on a branch prediction history that is "stale" (i.e., does not contain branch predictions for the most recently encountered conditional branch instructions). As a result, the accuracy and performance of the second branch predictor may be less than optimal.

SPECULATIVE HISTORY FORWARDING IN OVERRIDING BRANCH PREDICTORS, AND RELATED CIRCUITS, METHODS, AND COMPUTER-READABLE MEDIA

BACKGROUND

I. Field of the Disclosure

The technology of the disclosure relates generally to branch prediction in computer systems.

II. Background

Instruction pipelining is a processing technique whereby the throughput of computer instructions being executed by a processor may be increased by splitting the handling of each instruction into a series of steps. These steps are executed in an execution pipeline composed of multiple stages. Optimal processor performance may be achieved if all stages in an execution pipeline are able to process instructions concurrently. However, concurrent execution of instructions in an execution pipeline may be hampered by the presence of conditional branch instructions. Conditional branch instructions may redirect the flow of a program based on conditions evaluated when the conditional branch instructions are executed. As a result, the processor may have to stall the fetching of additional instructions until a conditional branch instruction has executed, resulting in reduced processor performance and increased power consumption.

One approach for maximizing processor performance involves utilizing a branch prediction circuit to predict whether a conditional branch instruction will be taken. The prediction of whether a conditional branch instruction will be taken can be based on a branch prediction history of previous conditional branch instructions. Instructions corresponding to the predicted branch may then be fetched and speculatively executed by the processor. In the event of a mispredicted branch, the processor may incur a delay while the fetched instructions corresponding to the mispredicted branch are flushed from the execution pipeline, and the instructions corresponding to the taken branch are fetched. Accordingly, an accurate branch predictor is required to minimize the penalties (in terms of both decreased processor performance and unnecessary power consumption) of branch mispredictions.

Accuracy of conventional branch predictors may generally correspond to a number of processor clock cycles required to generate a branch prediction. For example, a relatively simple branch predictor may require only a single processor clock cycle to provide a branch prediction, but the resulting branch prediction may be less accurate. Conversely, a more complex branch predictor may provide a higher degree of accuracy, but may suffer from a multi-cycle latency (i.e., may require multiple processor clock cycles to generate a branch prediction).

To mitigate the tradeoff between accuracy and speed, an "overriding branch predictor" may employ a faster, less accurate first branch predictor in conjunction with a slower, more accurate second branch predictor. Both branch predictors provide predictions for each conditional branch instruction, with the second branch predictor providing its prediction a few processor clock cycles later than the first branch predictor. The processor initially fetches instructions based on the branch prediction of the first branch predictor. When the branch prediction of the second branch predictor is generated, the processor compares it to the first branch prediction. If the predictions differ, the second prediction is used to overwrite the first prediction in the branch prediction history for the first branch predictor, and the proper instruc-

SUMMARY OF THE DISCLOSURE

Embodiments of the disclosure provide speculative history forwarding in overriding branch predictors. Related circuits, methods, and computer-readable media are also disclosed. In this regard, in one embodiment, a branch prediction circuit including a first branch predictor and a second branch predictor is provided. The first branch predictor generates a first branch prediction for a conditional branch instruction, and the first branch prediction is stored in a first branch prediction history. The first branch prediction is also speculatively forwarded to a second branch prediction history. The second branch predictor subsequently generates a second branch prediction based on the second branch prediction history, including the speculatively forwarded first branch prediction. By enabling the second branch predictor to base its branch prediction on the speculatively forwarded first branch prediction, an accuracy of the second branch predictor may be improved.

In another embodiment, a branch prediction circuit for performing branch prediction of fetched instructions in a processor is provided. The branch prediction circuit comprises a first branch predictor, a forwarding circuit, and a second branch predictor. The first branch predictor is configured to predict a first branch prediction of a conditional branch instruction in an instruction queue, and update a first branch prediction history register based on the first branch prediction for the conditional branch instruction. The forwarding circuit is configured to forward the first branch prediction for the conditional branch instruction to a second branch prediction history register as a speculative prediction. The second branch predictor is configured to predict a second branch prediction of the conditional branch instruction in the instruction queue based on the second branch prediction history register including the speculative prediction. In this manner, an accuracy of the second branch predictor may be improved by basing branch predictions on the speculatively forwarded branch prediction.

In another embodiment, a branch prediction circuit for performing branch prediction of fetched instructions in a processor is provided. The branch prediction circuit comprises a first branch predictor means for predicting a first branch prediction of a conditional branch instruction in an instruction queue, and updating a first branch prediction history register based on the first branch prediction for the conditional branch instruction. The branch prediction circuit further comprises a forwarding means for forwarding the first branch prediction for the conditional branch instruction to a second branch prediction history register as a speculative prediction. The branch prediction circuit also comprises a second branch predictor means for predicting a second branch prediction of the conditional branch instruction in the instruction queue based on the second branch prediction history register including the speculative prediction.

In another embodiment, a method for performing branch prediction of fetched instructions in a processor is provided. The method comprises predicting a first branch prediction of a conditional branch instruction in an instruction queue by a first branch predictor based on a first branch prediction history. The method further comprises updating the first branch prediction history based on the first branch prediction for the conditional branch instruction. The method also comprises forwarding the first branch prediction for the conditional branch instruction to a second branch prediction history as a speculative prediction. The method additionally comprises predicting a second branch prediction of the conditional branch instruction in the instruction queue by a second branch predictor based on the second branch prediction history including the speculative prediction.

In another embodiment, a non-transitory computer-readable medium having stored thereon computer executable instructions to cause a processor to implement a method for performing branch prediction of fetched instructions in the processor is provided. The method implemented by the computer executable instructions comprises predicting a first branch prediction of a conditional branch instruction in an instruction queue by a first branch predictor based on a first branch prediction history. The method implemented by the computer executable instructions further comprises updating the first branch prediction history based on the first branch prediction for the conditional branch instruction. The method implemented by the computer executable instructions also comprises forwarding the first branch prediction for the conditional branch instruction to a second branch prediction history as a speculative prediction. The method implemented by the computer executable instructions additionally comprises predicting a second branch prediction of the conditional branch instruction in the instruction queue by a second branch predictor based on the second branch prediction history including the speculative prediction.

DETAILED DESCRIPTION

Figure 1:
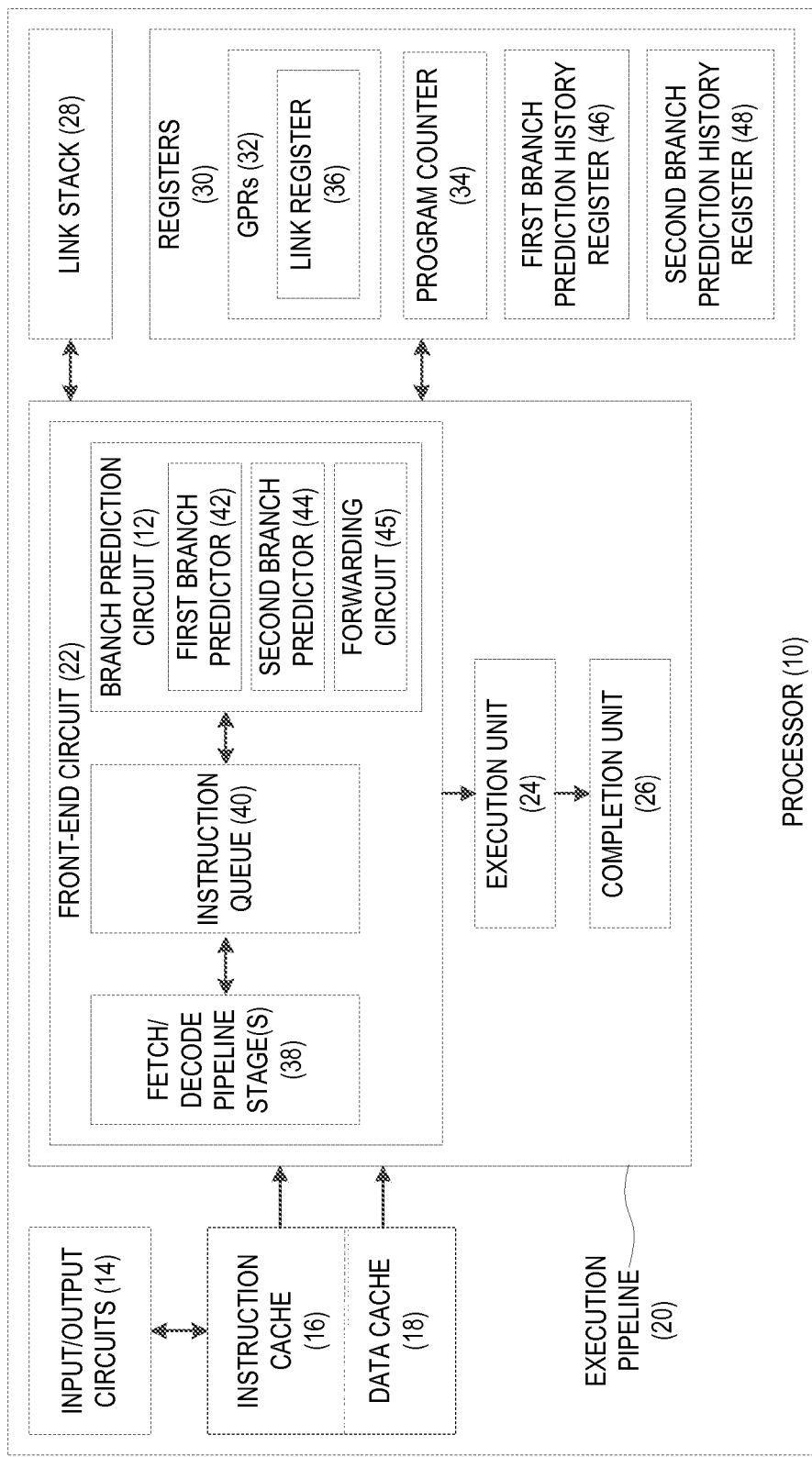
FIG. 1 is a block diagram of an exemplary processor that includes a branch prediction circuit providing a faster but less accurate first branch predictor and a slower but more accurate second branch predictor, and that is configured to perform speculative history forwarding.

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments.

Embodiments of the disclosure provide speculative history forwarding in overriding branch predictors. Related circuits, methods, and computer-readable media are also disclosed. In this regard, in one embodiment, a branch prediction circuit including a first branch predictor and a second branch predictor is provided. The first branch predictor generates a first branch prediction for a conditional branch instruction, and the first branch prediction is stored in a first branch prediction history. The first branch prediction is also speculatively forwarded to a second branch prediction history. The second branch predictor subsequently generates a second branch prediction based on the second branch prediction history, including the speculatively forwarded first branch prediction. By enabling the second branch predictor to base its branch prediction on the speculatively forwarded first branch prediction, an accuracy of the second branch predictor may be improved.

In another embodiment, a branch prediction circuit for performing branch prediction of fetched instructions in a processor is provided. The branch prediction circuit comprises a first branch predictor, a forwarding circuit, and a second branch predictor. The first branch predictor is configured to predict a first branch prediction of a conditional branch instruction in an instruction queue, and update a first branch prediction history register based on the first branch prediction for the conditional branch instruction. The forwarding circuit is configured to forward the first branch prediction for the conditional branch instruction to a second branch prediction history register as a speculative prediction. The second branch predictor is configured to predict a second branch prediction of the conditional branch instruction in the instruction queue based on the second branch prediction history register including the speculative prediction. In this manner, an accuracy of the second branch predictor may be improved by basing branch predictions on the speculatively forwarded branch prediction.

In this regard, FIG. 1 is a block diagram of an exemplary processor 10. The processor 10 includes a branch prediction circuit 12 that is configured to provide speculative history forwarding to improve prediction accuracy, as disclosed herein. "Speculative history forwarding" refers to operations for utilizing branch predictions generated by a first branch predictor to supplement a branch prediction history for a second branch predictor that, due to latency issues, would otherwise base its branch predictions on a stale branch prediction history. Before discussing the exemplary speculative history forwarding features of the processor 10 of FIG. 1, a brief introduction of FIG. 1 is provided. Next, an example of branch prediction without the use of speculative history forwarding is discussed with respect to the illustration in FIG. 2 of branch prediction without the use of speculative history forwarding. The use of speculative history forwarding by the branch prediction circuit 12 of FIG. 1 to improve branch prediction accuracy is then described in FIG. 3.

In this regard, in FIG. 1, the processor 10 may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor dies or packages. The processor 10 includes input/output circuits 14, an instruction cache 16, and a data cache 18. The processor 10 further comprises an execution pipeline 20, which includes a front-end circuit 22, an execution unit 24, and a completion unit 26. The processor 10 additionally includes a link stack 28 and registers 30, which comprise one or more general purpose registers (GPR) 32, a program counter 34, and a link register 36. In some embodiments, such as those employing the ARM® ARM7™ architecture, the link register 36 is one of the GPRs 32, as shown in FIG. 1. Alternately, some embodiments, such as those utilizing the IBM® PowerPC® architecture, may provide that the link register 36 is separate from the GPRs 32 (not shown).

In exemplary operation, the front-end circuit 22 of the execution pipeline 20 fetches instructions (not shown) from the instruction cache 16, which in some embodiments may be an on chip Level 1 (L1) cache, as a non-limiting example. The fetched instructions are decoded by the front-end circuit 22 and issued to the execution unit 24. The execution unit 24 executes the issued instructions, and the completion unit 26 retires the executed instructions. In some embodiments, the completion unit 26 may comprise a write-back mechanism that stores the execution results in one or more of the registers 30. It is to be understood that the execution unit 24 and/or the completion unit 26 may each comprise one or more sequential pipeline stages. It is to be further understood that instructions may be fetched and/or decoded in groups of more than one.

To improve performance, the processor 10 may employ branch prediction, the exemplary operation of which is now described. The front-end circuit 22 comprises one or more fetch/decode pipeline stages 38, which enable multiple instructions to be fetched and decoded concurrently. An instruction queue 40 for holding fetched instructions pending dispatch to the execution unit 24 is communicatively coupled to one or more of the fetch/decode pipeline stages 38. The instruction queue 40 is also communicatively coupled to the branch prediction circuit 12, which is configured to generate branch predictions (not shown) for conditional branch instructions that are encountered in the instruction queue 40. In the example of FIG. 1, the branch prediction circuit 12 includes a first branch predictor 42, a second branch predictor 44, and a forwarding circuit 45. In some embodiments, the first branch predictor 42 may be configured to operate with a lower latency than the second branch predictor 44. For example, the first branch predictor 42 may generate a branch prediction with a latency of just a single processor clock cycle, while the second branch predictor 44 may require multiple processor clock cycles (i.e., multi-cycle latency) to generate a more accurate branch prediction. In such embodiments, the first branch predictor 42 typically operates with a lower accuracy than the second branch predictor 44. Thus, embodiments of the first branch predictor 42 may be faster but less accurate, while embodiments of the second branch predictor 44 may be slower (i.e., may suffer from a multi-cycle latency) but more accurate. The forwarding circuit 45 of the branch prediction circuit 12 is configured to carry out operations for speculative history forwarding, as discussed in greater detail below.

One or more branch predictions generated by the first branch predictor 42 and the second branch predictor 44 may be stored in a first branch prediction history register 46 and a second branch prediction history register 48, respectively, of the registers 30. In some embodiments, the first branch prediction history register 46 and/or the second branch prediction history register 48 may be included among the GPRs 32 of the registers 30, or may be implemented separately from the registers 30. Some embodiments may provide that the first branch prediction history register 46 and the second branch prediction history register 48 may be implemented using a single history register (not shown), with first and second pointers (not shown) indicating the most recent entry corresponding to each of the first branch prediction history register 46 and the second branch prediction history register 48, respectively. This embodiment is discussed in greater detail with respect to FIG. 5 below.

It is to be understood that the first branch prediction history register 46 and the second branch prediction history register 48 may be configured to store any type of history data known in the art to be useful for branch prediction. As non-limiting examples, the history data may include a local history, a global history, and/or a path history. A local history may comprise a branch prediction history including branch predictions for a particular conditional branch instruction(s), while a global history may comprise a shared branch prediction history including branch predictions for all conditional branch instructions. A path history may comprise a branch prediction history including data such as a branch target, a determination of whether or not a particular branch is taken, and/or a context of a path leading to a conditional branch instruction.

In the example of FIG. 1, the branch prediction circuit 12 of the processor 10 operates as an overriding branch predictor. Accordingly, when a conditional branch instruction is encountered in the instruction queue 40, both the first branch predictor 42 and the second branch predictor 44 begin operations to determine a branch prediction. The first branch predictor 42 generates a first branch prediction (not shown), which is stored in the first branch prediction history register 46. The processor 10 proceeds to speculatively fetch and execute the instructions corresponding to the branch prediction. The second branch predictor 44 generates a second, more accurate branch prediction (not shown) a number of processor clock cycles later, depending on the additional latency of the second branch predictor 44. The second branch prediction is stored in the second branch prediction history register 48. The second branch prediction is then compared to the first branch prediction. If there is a mismatch, the second branch prediction is used to update the first branch prediction history register 46 by overriding the first branch prediction. Because the second branch prediction may be assumed to be more accurate than the first branch prediction, the accuracy of the first branch predictor 42 may be improved by updating the first branch prediction history register 46 with the second branch prediction. The processor 10 then re-fetches instructions corresponding to the second branch prediction.

While the second branch predictor 44 may achieve a higher accuracy than the first branch predictor 42, in the absence of speculative history forwarding, the second branch predictor 44 still may not achieve optimal accuracy due to the effect that its multi-cycle latency has on the second branch prediction history register 48. In particular, because of the multi-cycle latency of the second branch predictor 44, the second branch prediction history register 48 may lack the branch predictions for the most recently encountered conditional branch instructions at the time the second branch predictor 44 generates a new branch prediction. As a result, the second branch predictor 44 must base its branch predictions on a stale branch prediction history, which could result in a suboptimal accuracy level.

Figure 2:
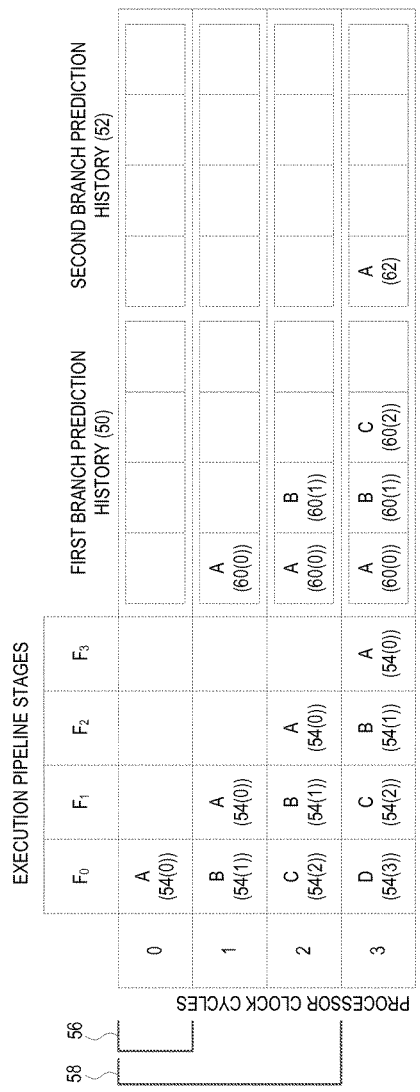
FIG. 2 is a timing diagram illustrating processing of exemplary conditional branch instructions using overriding branch predictors without speculative history forwarding.

To illustrate the effect of multi-cycle latency in the absence of speculative history forwarding, FIG. 2 is provided. FIG. 2 is a timing diagram illustrating contents of a first branch prediction history 50 and a second branch prediction history 52 resulting from processing exemplary conditional branch instructions 54(0)-54(3) without speculative history forwarding. The columns of the timing diagram of FIG. 2 represent execution pipeline stages, referred to in this example as $F_0$, $F_1$, $F_2$, and $F_3$. The rows of the timing diagram represent processor clock cycles 0-3, and illustrate the contents of the execution pipeline stages during each processor clock cycle. Each row also shows the contents of the first branch prediction history 50 and the second branch prediction history 52 during the corresponding processor clock cycle. It is to be understood that the first branch prediction history 50 is associated with a faster, less accurate branch predictor, such as the first branch predictor 42 of FIG. 1. Likewise, the second branch prediction history 52 corresponds to a slower, more accurate branch predictor, such as the second branch predictor 44 of FIG. 1. For purposes of illustration, it is assumed that the first branch predictor 42 associated with the first branch prediction history 50 has a latency 56 of one processor clock cycle, while the second branch predictor 44 associated with the second branch prediction history 52 has a multi-cycle latency 58 of three processor clock cycles. It is to be further understood that the first branch prediction history 50 and the second branch prediction history 52 may represent contents stored in the first branch prediction history register 46 and the second branch prediction history register 48, respectively, of FIG. 1.

With reference to FIG. 2, processing begins with processor clock cycle 0. At this time, the conditional branch instruction 54(0) (referred to as branch instruction A) enters the execution pipeline stage $F_0$. During processor clock cycle 0, both the first branch predictor 42 and the second branch predictor 44 begin generating branch predictions (not shown) for the branch instruction A. The first branch prediction history 50 and the second branch prediction history 52 are both empty at this point.

At processor clock cycle 1, the first branch predictor 42 has completed its generation of a branch prediction 60(0) for the branch instruction A. The first branch prediction history 50 is updated to contain the branch prediction 60(0) for the branch instruction A. The second branch predictor 44, however, has not yet generated a prediction for the branch instruction A. Thus, the second branch prediction history 52 is still empty. The branch instruction A continues on to execution pipeline stage $F_1$, while the conditional branch instruction 54(1) (branch instruction B) enters the execution pipeline stage $F_0$. At this point, both the first branch predictor 42 and the second branch predictor 44 begin generating branch predictions (not shown) for the branch instruction B. Because the first branch prediction history 50 includes the branch prediction 60(0) for the branch instruction A, the first branch predictor 42 has the benefit of the earlier branch prediction in generating a prediction for the branch instruction B. The second branch prediction 44 still has no branch prediction history on which to base its branch predictions.

In processor clock cycle 2, the first branch predictor 42 has generated a branch prediction 60(1) for the branch instruction B, which is now stored in the first branch prediction history 50. The second branch prediction history 52 remains empty, as the second branch predictor 44 still has not completed generating a branch prediction for either of the branch instructions A and B. As branch instructions A and B proceed to execution pipeline stage $F_2$ and $F_1$, respectively, the conditional branch instruction 54(2) (branch instruction C) enters the execution pipeline stage $F_0$. The first branch predictor 42 and the second branch predictor 44 begin generating branch predictions (not shown) for the branch instruction C. The first branch predictor 42 has the benefit of the branch predictions 60(0) and 60(1) for branch instructions A and B, respectively, when generating its branch prediction, while the second branch predictor 44 has none.

At processor clock cycle 3, the branch instructions A, B, and C have continued on to execution pipeline stages $F_3$, $F_2$, and $F_1$, respectively, and the conditional branch instruction 54(3) (branch instruction D) enters the execution pipeline stage $F_0$. By this time, the first branch predictor 42 has generated a branch prediction 60(2) for the branch instruction C, which is now stored in the first branch prediction history 50. Thus, when the first branch predictor 42 begins generating a branch prediction (not shown) for the branch instruction D, it may base that branch prediction on the previous branch predictions 60(0), 60(1), and 60(2) for branch instructions A, B, and C, respectively. In processor clock cycle 3, the second branch predictor 44 finally completes generating a branch prediction 62 for the branch instruction A. As a result, the second branch prediction history 52 is updated to contain the branch prediction 62 for the branch instruction A. The branch prediction 62 is compared with the branch prediction 60(0) that was stored in the first branch prediction history 50 in processor clock cycle 1. If the branch prediction 62 is different from the branch prediction 60(0), the first branch prediction history 50 is overridden (i.e., updated with the branch prediction 62). By overriding the first branch prediction history 50, the accuracy of the first branch predictor 42 may be improved. However, note that as the second branch predictor 44 begins generating a branch prediction (not shown) for the branch instruction D, it still only has the previous branch prediction 62 for the branch instruction A on which to base its branch prediction.

To mitigate the effects of multi-cycle latency on the second branch predictor 44 described in FIG. 2, the forwarding circuit 45 of the branch prediction circuit 12 is provided in the processor 10 in FIG. 1. The forwarding circuit 45 is configured to provide speculative history forwarding to supplement the branch prediction history used by the second branch predictor 44 in order to improve the accuracy of the second branch predictor 44. In this regard, FIG. 3 is provided to illustrate contents of a first branch prediction history 64 and a second branch prediction history 66 resulting from processing exemplary conditional branch instructions 68(0)-68(3) using speculative history forwarding provided by the forwarding circuit 45.

Figure 3:
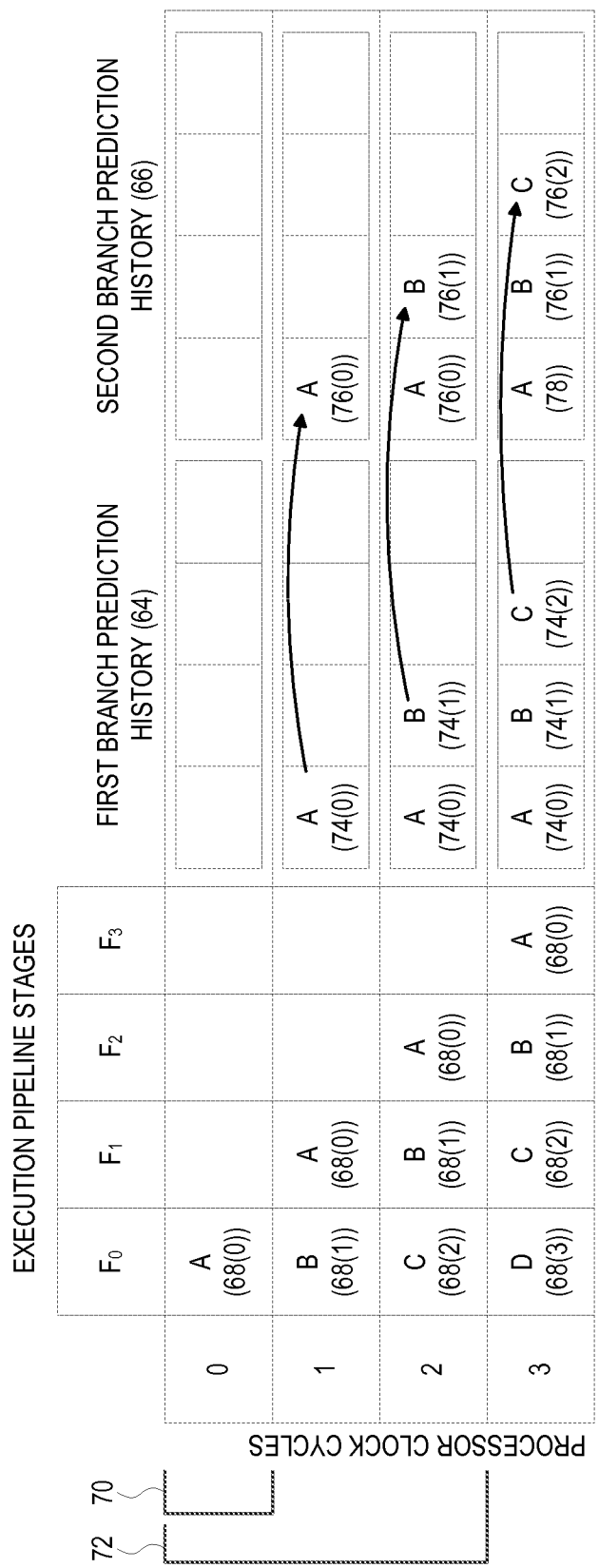
FIG. 3 is a timing diagram illustrating the use of speculative history forwarding by the branch prediction circuit of FIG. 1 during processing of exemplary conditional branch instructions to improve branch prediction accuracy.

In this regard, as with FIG. 2, the columns of the timing diagram of FIG. 3 represent execution pipeline stages $F_0$, $F_1$, $F_2$, and $F_3$, while the rows of the timing diagram illustrate the contents of the first branch prediction history 64 and the second branch prediction history 66 during processor clock cycles 0-3. In this example, the first branch prediction history 64 corresponds to the faster, less accurate first branch predictor 42 of FIG. 1, while the second branch prediction history 66 corresponds to the slower, more accurate second branch predictor 44 of FIG. 1. For purposes of illustration, it is assumed that the first branch predictor 42 has a latency 70 of one processor clock cycle, while the second branch predictor 44 has a multi-cycle latency 72 of three processor clock cycles. It is to be further understood that the first branch prediction history 64 and the second branch prediction history 66 may represent contents stored in the first branch prediction history register 46 and the second branch prediction history register 48, respectively, of FIG. 1.

At processor clock cycle 0, processing begins with the conditional branch instruction 68(0) (referred to as branch instruction A) entering the execution pipeline stage $F_0$. Both the first branch predictor 42 and the second branch predictor 44 begin generating branch predictions for the branch instruction A. During processor clock cycle 0, both the first branch prediction history 64 and the second branch prediction history 66 are empty.

During processor clock cycle 1, a branch prediction 74(0) for the branch instruction A is generated by the first branch predictor 42 and stored in the first branch prediction history 64. At this point, the forwarding circuit 45 of the branch prediction circuit 12 also forwards the branch prediction 74(0) generated by the first branch predictor 42 for the branch instruction A to the second branch prediction history 66 as a speculative prediction 76(0). While the branch instruction A continues on to execution pipeline stage $F_1$, the conditional branch instruction 68(1) (branch instruction B) enters the execution pipeline stage $F_0$. At this point, both the first branch predictor 42 and the second branch predictor 44 begin generating branch predictions for the branch instruction B. Because the first branch prediction history 64 includes the branch prediction 74(0) for the branch instruction A, the first branch predictor 42 has the benefit of an earlier branch prediction in generating a branch prediction for the branch instruction B. Additionally, because the second branch prediction history 66 now contains the speculative prediction 76(0) for the branch instruction A, the second branch predictor 44 may now base its next branch prediction for the branch instruction B on the speculative prediction 76(0). This may result in a more accurate branch prediction being generated by the second branch predictor 44 for the branch instruction B as compared to basing the branch prediction on a stale branch prediction history.

Processing continues in a similar manner in processor clock cycle 2. Here, the first branch predictor 42 completes its generation of a branch prediction 74(1) for the branch instruction B, and the first branch prediction history 64 is updated to store the branch prediction 74(1). The branch prediction 74(1) is also forwarded by the forwarding circuit 45 to the second branch prediction history 66 as a speculative prediction 76(1). As branch instructions A and B proceed to execution pipeline stages $F_2$ and $F_1$, respectively, the conditional branch instruction 68(2) (branch instruction C) enters the execution pipeline stage $F_0$. The first branch predictor 42 and the second branch predictor 44 begin generating branch predictions for the branch instruction C, with both the first branch predictor 42 and the second branch predictor 44 having the benefit of the earlier branch predictions for branch instructions A and B by the first branch predictor 42.

At processor clock cycle 3, the branch instructions A, B, and C have continued on to execution pipeline stages $F_3$, $F_2$, and $F_1$, respectively, and the conditional branch instruction 68(3) (branch instruction D) enters the execution pipeline stage $F_0$. At this point, the first branch predictor 42 has generated a branch prediction 74(2) for the branch instruction C, which is now stored in the first branch prediction history 64, and which is forwarded to the second branch prediction history 66 as a speculative prediction 76(2). Thus, when the first branch predictor 42 begins generating a branch prediction (not shown) for the branch instruction D, it bases that branch prediction on the previous branch predictions 74(0), 74(1), and 74(2) for branch instructions A, B, and C. During processor clock cycle 3, the second branch predictor 44 finally completes generating a branch prediction 78 for the branch instruction A. The branch prediction 78 is compared with the speculative prediction 76(0) that was forwarded to the second branch prediction history 66 in processor clock cycle 1. If the branch prediction 78 is different from the speculative prediction 76(0), the second branch prediction history 66 is overridden (i.e., updated with the branch prediction 78), as shown in FIG. 3. The branch prediction 74(0) in the first branch prediction history 64 may also be overridden based on the branch prediction 78. The second branch predictor 44 then proceeds with generating a branch prediction (not shown) for the branch instruction D based on the contents of the second branch prediction history 66.

Figure 4:
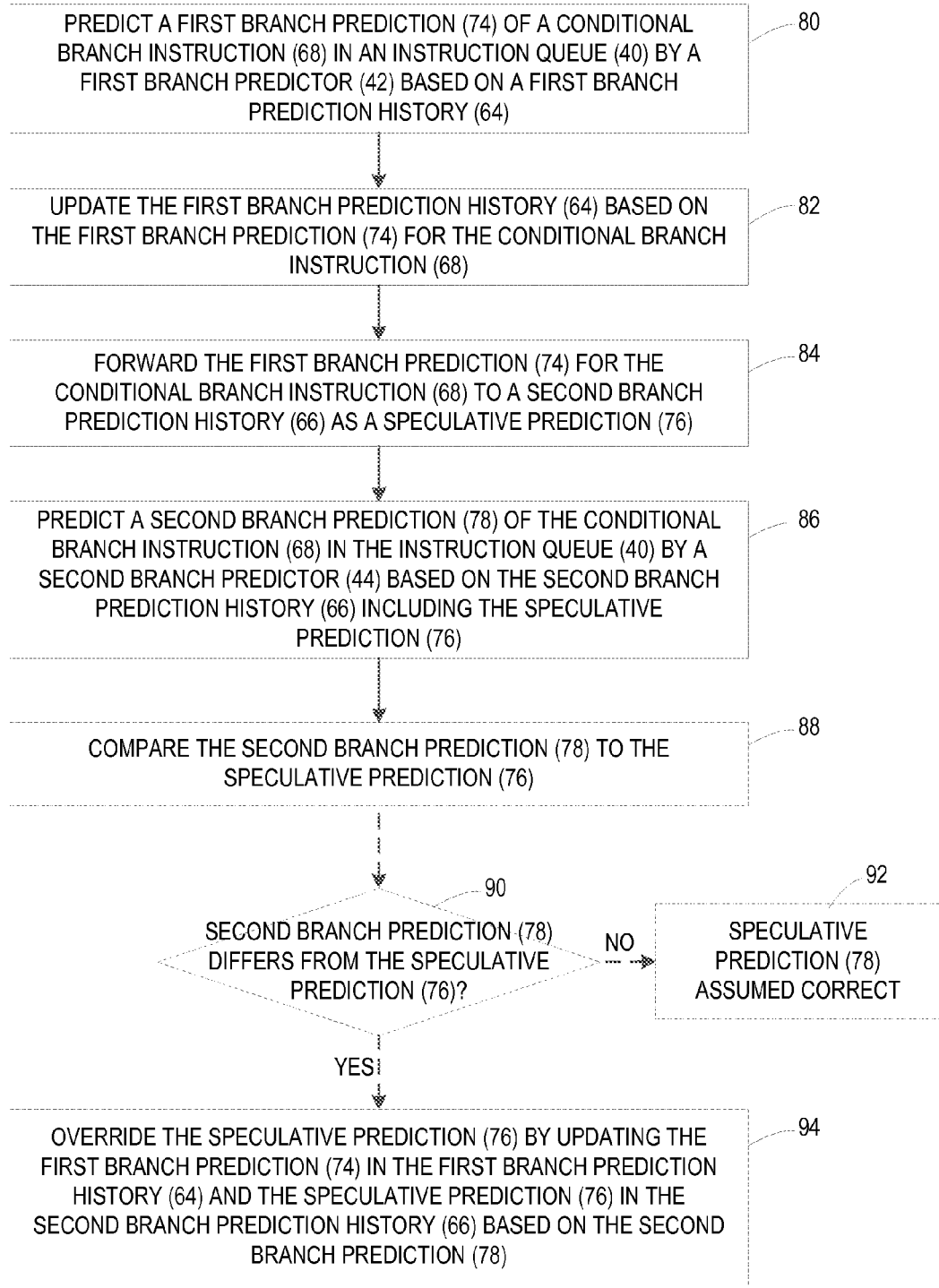
FIG. 4 is a flowchart of exemplary operations for performing speculative history forwarding.

FIG. 4 is a flowchart of exemplary operations for performing speculative history forwarding described above, by example, in the processor 10 in FIG. 1. For the sake of clarity, elements of FIG. 1 and FIG. 3 are referenced in describing FIG. 4. In FIG. 4, operations begin with the first branch predictor 42 of the branch prediction circuit 12 predicting a first branch prediction 74 of a conditional branch instruction 68 in an instruction queue 40, based on a first branch prediction history 64 (block 80). The first branch prediction history 64 corresponds to contents of the first branch prediction history register 46 of FIG. 1.

With continuing reference to FIG. 4, the branch prediction circuit 12 next updates the first branch prediction history 64 based on the first branch prediction 74 for the conditional branch instruction 68 (block 82). The forwarding circuit 45 of the branch prediction circuit 12 then forwards the first branch prediction 74 for the conditional branch instruction 68 to a second branch prediction history 66 as a speculative prediction 76 (block 84). The second branch predictor 44 then predicts a second branch prediction 78 of the conditional branch instruction 68 in the instruction queue 40 based on the second branch prediction history 66 including the speculative prediction 76 (block 86). In this manner, the speculative prediction 76 originally generated by the first branch predictor 42 is made available to the second branch predictor 44 to improve its accuracy compared to generating branch predictions using a stale branch prediction history.

In some embodiments, additional optional steps may be carried out by the branch prediction circuit 12 of FIG. 1. The branch prediction circuit 12 may compare the second branch prediction 78 to the speculative prediction 76 (block 88). Based on the comparison, the branch prediction circuit 12 may determine whether the second branch prediction 78 differs from the speculative prediction 76 (block 90). If not, the speculative prediction 76 is assumed to be correct (block 92). If the branch prediction circuit 12 determines at block 90 that the second branch prediction 78 differs from the speculative prediction 76, the branch prediction circuit 12 overrides the speculative prediction 76 by updating the first branch prediction 74 in the first branch prediction history 64 and the speculative prediction 76 in the second branch prediction history 66 based on the second branch prediction 78 (block 94).

Figure 5:
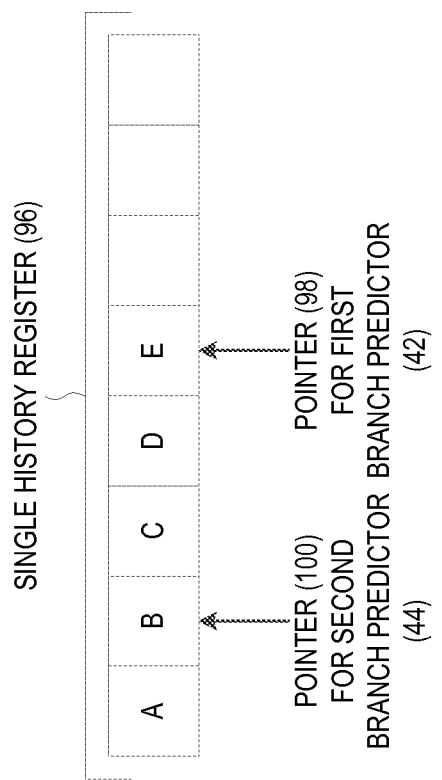
FIG. 5 is a diagram illustrating an exemplary single history register for storing multiple branch prediction histories.

As noted above, in some embodiments the first branch prediction history register 46 and the second branch prediction history register 48 may be implemented as a single history register. In this regard, FIG. 5 illustrates an exemplary single history register 96 for storing multiple branch prediction histories. The single history register 96 may be implemented as one of the registers 30 of FIG. 1, or may be implemented as separate structures.

As seen in FIG. 5, the single history register 96 stores branch predictions generated by both the first branch predictor 42 and the second branch predictor 44 of FIG. 1. Two pointers 98 and 100 indicate the most recent branch prediction stored in the single history register 96 by the first branch predictor 42 and the second branch predictor 44, respectively. Upon initialization, both pointers 98 and 100 point to a same location within the single history register 96. As each of the first branch predictor 42 and the second branch predictor 44 generate branch predictions, the location pointed to by each pointer 98, 100 is updated with a most recent branch prediction, and the pointers 98, 100 are advanced. Because the first branch predictor 42 has a lower latency than the second branch predictor 44, the pointer 98 corresponding to the first branch predictor 42 will advance a number of locations corresponding to the difference in latency. Once the second branch predictor 44 begins generating its branch predictions, the pointers 98 and 100 move in lockstep.

Both the first branch predictor 42 and the second branch predictor 44 are configured to access a branch prediction history (not shown) stored in the single history register 96. From the perspective of the second branch predictor 44, the branch predictions between the pointer 100 and the pointer 98 are speculative predictions. As the second branch predictor 44 generates branch predictions, it may update the branch prediction at the location pointed to by the pointer 100 as necessary to override any speculative mis-predictions generated by the first branch predictor 42.

The branch prediction circuit 12 according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 6:
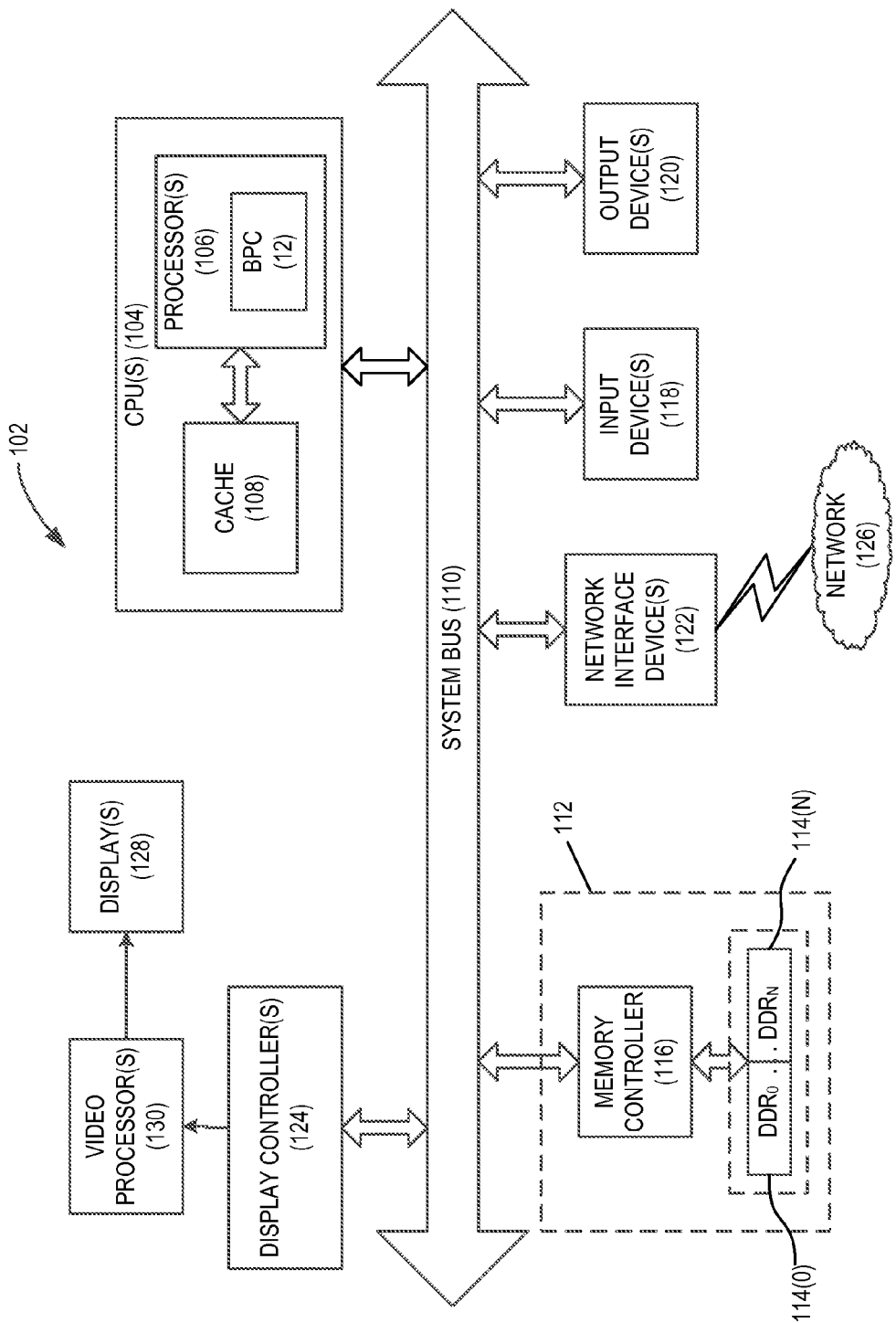
FIG. 6 is a block diagram of an exemplary processor-based system that can include the branch prediction circuit of FIG. 1.

In this regard, FIG. 6 illustrates an example of a processor-based system 102 that can employ the branch prediction circuit 12 illustrated in FIG. 1. In this example, the processor-based system 102 includes one or more central processing units (CPUs) 104, each including one or more processors 106 that may comprise the branch prediction circuit (BPC) 12 of FIG. 1. The CPU(s) 104 may have cache memory 108 coupled to the processor(s) 106 for rapid access to temporarily stored data. The CPU(s) 104 is coupled to a system bus 110 and can intercouple master and slave devices included in the processor-based system 102. As is well known, the CPU(s) 104 communicates with these other devices by exchanging address, control, and data information over the system bus 110. For example, the CPU(s) 104 can communicate bus transaction requests to a memory system 112, which provides memory units 114(0)-114(N).

Other master and slave devices can be connected to the system bus 110. As illustrated in FIG. 6, these devices can include a memory controller 116, one or more input devices 118, one or more output devices 120, one or more network interface devices 122, and one or more display controllers 124, as examples. The input device(s) 118 can include any type of input device, including but not limited to input keys, switches, voice processors, etc. The output device(s) 120 can include any type of output device, including but not limited to audio, video, other visual indicators, etc. The network interface device(s) 122 can be any devices configured to allow exchange of data to and from a network 126. The network 126 can be any type of network, including but not limited to a wired or wireless network, a private or public network, a local area network (LAN), a wide local area network (WLAN), and the Internet. The network interface device(s) 122 can be configured to support any type of communications protocol desired.

The CPU(s) 104 may also be configured to access the display controller(s) 124 over the system bus 110 to control information sent to one or more displays 128. The display controller(s) 124 sends information to the display(s) 128 to be displayed via one or more video processors 130, which process the information to be displayed into a format suitable for the display(s) 128. The display(s) 128 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A branch prediction circuit for performing branch prediction of fetched instructions in a processor, comprising:
   a first branch predictor configured to:
      predict a first branch prediction of a conditional branch instruction in an instruction queue; and
      update a first branch prediction history register based on the first branch prediction for the conditional branch instruction;
   a forwarding circuit configured to forward the first branch prediction for the conditional branch instruction to a second branch prediction history register as a speculative prediction; and
   a second branch predictor configured to predict a second branch prediction of the conditional branch instruction in the instruction queue based on the second branch prediction history register including the speculative prediction.

2. The branch prediction circuit of claim 1 further configured to:
   compare the second branch prediction to the speculative prediction; and
   responsive to the second branch prediction differing from the speculative prediction, override the speculative prediction by updating the first branch prediction in the first branch prediction history register and the speculative prediction in the second branch prediction history register based on the second branch prediction.

3. The branch prediction circuit of claim 1, wherein the first branch predictor is configured to operate with a first latency and a first accuracy, and the second branch predictor is configured to operate with a second latency higher than the first latency and a second accuracy higher than the first accuracy.

4. The branch prediction circuit of claim 1, wherein:
   the first branch prediction history register comprises a first global history, a first local history, or a first path history, or a combination thereof; and
   the second branch prediction history register comprises a second global history, a second local history, or a second path history, or a combination thereof.

5. The branch prediction circuit of claim 1 further comprising a single history register comprising the first branch prediction history register and the second branch prediction history register.

6. The branch prediction circuit of claim 5, wherein the single history register comprises:
   a first pointer indicating a most recent branch prediction in the first branch prediction history register; and
   a second pointer indicating a most recent branch prediction in the second branch prediction history register.

7. The branch prediction circuit of claim 1 integrated into an integrated circuit.

8. The branch prediction circuit of claim 1 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

9. A branch prediction circuit for performing branch prediction of fetched instructions in a processor, comprising:
   a first branch predictor means for:
      predicting a first branch prediction of a conditional branch instruction in an instruction queue; and
      updating a first branch prediction history register based on the first branch prediction for the conditional branch instruction;
   a forwarding means for forwarding the first branch prediction for the conditional branch instruction to a second branch prediction history register as a speculative prediction; and
   a second branch predictor means for predicting a second branch prediction of the conditional branch instruction in the instruction queue based on the second branch prediction history register including the speculative prediction.

10. A method for performing branch prediction of fetched instructions in a processor, comprising:
    predicting a first branch prediction of a conditional branch instruction in an instruction queue by a first branch predictor based on a first branch prediction history;
    updating the first branch prediction history based on the first branch prediction for the conditional branch instruction;
    forwarding the first branch prediction for the conditional branch instruction to a second branch prediction history as a speculative prediction; and
    predicting a second branch prediction of the conditional branch instruction in the instruction queue by a second branch predictor based on the second branch prediction history including the speculative prediction.

11. The method of claim 10, further comprising:
    comparing the second branch prediction to the speculative prediction; and
    responsive to the second branch prediction differing from the speculative prediction, overriding the speculative prediction by updating the first branch prediction in the first branch prediction history and the speculative prediction in the second branch prediction history based on the second branch prediction.

12. The method of claim 10, wherein the first branch predictor operates with a first latency and a first accuracy, and the second branch predictor operates with a second latency higher than the first latency and a second accuracy higher than the first accuracy.

13. The method of claim 10, wherein:
the first branch prediction history comprises a first global history, a first local history, or a first path history, or a combination thereof; and
the second branch prediction history comprises a second global history, a second local history, or a second path history, or a combination thereof.

14. The method of claim 10, further comprising storing the first branch prediction history and the second branch prediction history in a single history register.

15. The method of claim 14, further comprising:
indicating a most recent branch prediction in the first branch prediction history in the single history register by a first pointer; and
indicating a most recent branch prediction in the second branch prediction history in the single history register by a second pointer.

16. A non-transitory computer-readable medium having stored thereon computer executable instructions to cause a processor to implement a method for performing branch prediction of fetched instructions in the processor, comprising:
predicting a first branch prediction of a conditional branch instruction in an instruction queue by a first branch predictor based on a first branch prediction history;
updating the first branch prediction history based on the first branch prediction for the conditional branch instruction;
forwarding the first branch prediction for the conditional branch instruction to a second branch prediction history as a speculative prediction; and
predicting a second branch prediction of the conditional branch instruction in the instruction queue by a second branch predictor based on the second branch prediction history including the speculative prediction.

17. The non-transitory computer-readable medium of claim 16 having stored thereon the computer-executable instructions to cause the processor to implement the method, further comprising:
comparing the second branch prediction to the speculative prediction; and
responsive to the second branch prediction differing from the speculative prediction, overriding the speculative prediction by updating the first branch prediction in the first branch prediction history and the speculative prediction in the second branch prediction history based on the second branch prediction.

18. The non-transitory computer-readable medium of claim 16 having stored thereon the computer-executable instructions to cause the processor to implement the method, wherein the first branch predictor operates with a first latency and a first accuracy, and the second branch predictor operates with a second latency higher than the first latency and a second accuracy higher than the first accuracy.

19. The non-transitory computer-readable medium of claim 16 having stored thereon the computer-executable instructions to cause the processor to implement the method, further comprising storing the first branch prediction history and the second branch prediction history in a single history register.

20. The non-transitory computer-readable medium of claim 19 having stored thereon the computer-executable instructions to cause the processor to implement the method, further comprising:
indicating a most recent branch prediction in the first branch prediction history in the single history register by a first pointer; and
indicating a most recent branch prediction in the second branch prediction history in the single history register by a second pointer.

* * * * *